United States Patent Office 2,839,386
Patented June 17, 1958

2,839,386

METHOD OF PRODUCING TITANIUM

Ernest Davies, Widnes, England, assignor to Imperial Chemical Industries Limited, London, England, a corporation of Great Britain No Drawing. Application February 25, 1957
Serial No. 641,826

Claims priority, application Great Britain
February 27, 1956

4 Claims. (Cl. 75—84.5)

This invention relates to the manufacture of titanium metal and more particularly to an improved process for isolating titanium from the products of reaction obtained by the reduction of titanium tetrachloride with metallic sodium.

Many methods have been employed for separating sodium chloride from the crushed melt obtained by the reduction of titanium tetrachloride with metallic sodium. One common method has been to leach the crushed melt with water or else with an aqueous solution of nitric or hydrochloric acid. These processes have generally involved the use of a number of separating stages each of which has employed separate pieces of apparatus for solution, decantation and filtering purposes.

I have now found that the isolation of titanium from the crushed melt can be carried out satisfactorily and conveniently by a three-stage process in a single apparatus. In my process the first stage comprises feeding the crushed melt and dilute mineral acid continuously to a filter vessel in such a ratio as to produce a 15% to 25% concentration of sodium chloride. The solution is filtered through at such a rate as will maintain a steady level in the filter vessel and the process is continued until the concentration of leached titanium builds up to at least 300 kilograms per cubic metre in the form of a fairly thick slurry.

In the second stage of my process dilute acid, suitably 1% hydrochloric acid or 1% nitric acid, is fed for 30 to 90 minutes to the slurry while filtering is continued. Suitably the feed is continued for one hour.

The third stage consists of a water wash and water is fed into the filter vessel for sufficient time to wash the titanium substantially free from acid. Following this the leached and cleansed metal is then discharged from the vessel as a slurry in water which is finally filtered out and dried.

In a process for the manufacture of titanium by the reaction of titanium tetrachloride with metallic sodium and isolating the titanium therefrom the present invention is directed to an improvement whereby a pure titanium is separated from the product mixture in a single filter vessel. The improvement comprises feeding to the said filter vessel the ground product mixture and dilute aqueous acid so that a concentration of between 15% and 25% by weight of sodium chloride in solution is maintained while the solution is filtered continuously, adding dilute aqueous acid to the slurry remaining in the filter vessel after the addition of product mixture has been completed while filtering continuously and finally washing the retained titanium with water.

The best results are obtained, so I have found, when the ground product mixture contains no free sodium and to ensure this it is desirable that an excess of titanium tetrachloride is employed to react with sodium in the reaction process.

I prefer to employ as my filtering vessel a filtering pot having two perforated plates at the bottom which have sandwiched between them a polythene cloth. During the entire leaching and separation procedure I arrange for the contents of the filter vessel to be stirred vigorously by a stirrer preferably situated close to the bottom of the vessel.

I have further found that a clear filtrate can be obtained by suitable adjustments of the stirrer speed but that the fines so retained by the filter contaminate the product to some extent with both hydrogen and oxygen. When all the titanium fines are retained by the filter vessel I have found the product remaining to contain as much as 0.008% hydrogen and the material to give on arc-melting a massive titanium of hardness 140 D. P. N. or higher. I prefer therefore to utilise a filter material which allows the fine particles of titanium to pass through. A suitable filter material for this purpose is grade P–25 polythene cloth.

I have found it of particular advantage that the entire extraction of sodium chloride and the washing of titanium metal can be carried out in a single vessel thus saving considerably in vessel capacity and in operational time.

The following example illustrates but does not limit my invention:

*Example*

1288 lb. of melt and 3 m.$^3$ of 2% nitric acid were charged continuously over a period of one hour into a vessel 3 ft. diameter stirred by a two bladed pitched paddle 2'8" long, set ¾" above a filter covering the entire cross section of the vessel. The filter consisted of two perforated plates holding between them a polythene cloth of grade P–25. (The specification for this cloth was warp 86, weft 36, 3/1 twill weave, monofilament polythene thread 0.010 inch diameter.) The liquor level in the vessel was kept steady at 2 ft. above the filter by adjusting a run off valve situated below the filter. The effluent contained approximately 16% sodium chloride in acid solution together with some unwanted fine titanium in suspension. This latter consisted of most of the very fine material of less than 300 B. S. S. (British standard sieve) mesh and included about 50% material of less than 100 B. S. S. mesh.

When all the melt had been charged, the 2% nitric acid flow was stopped, and a flow of 3 m.$^3$/h. of 1% nitric acid substituted. This was charged for ¾ h., maintaining the level of liquor in the vessel at 2 ft. above the filter.

At the end of this period the acid charge was stopped and a flow of 2½ m.$^3$/h. water was submitted. This was charged for 1 h. maintaining the level of liquor in the vessel at 2 ft. above the filter.

At the end of this period, the water charge was stopped, and the run off valve below the filter was closed.

The metal was then removed from the vessel as a slurry through a line above the filter and then centrifuged and finally dried to give a titanium powder containing 0.002% hydrogen which on arc-melting gave a massive titanium of hardness 130 D. P. N.

What I claim is:

1. In a process for the manufacture of titanium by the reaction of titanium tetrachloride with metallic sodium and isolating the titanium therefrom, the improvement whereby a pure titanium is separated from the product mixture in a single filter vessel, which comprises feeding to the said filter vessel the ground product mixture and dilute aqueous mineral acid so that a concentration of between 15% and 25% by weight of sodium chloride in solution is maintained while the solution is filtered continuously, and finally washing the retained titanium with water.

2. The improved process according to claim 1 in which in the manufacture of titanium from titanium tetrachloride and sodium an excess of titanium tetrachloride is employed.

3. The improved process according to claim 1 in which continuous addition of dilute aqueous mineral acid is made to the slurry for a period of 30 to 90 minutes.

4. The improved process according to claim 1 in which during the entire leaching and separation process the contents of the filter vessel are stirred.

References Cited in the file of this patent
FOREIGN PATENTS 726,367   Great Britain _____ Mar. 16, 1955